(12) United States Patent
Oshiro

(10) Patent No.: US 8,423,228 B2
(45) Date of Patent: *Apr. 16, 2013

(54) APPARATUS AND METHOD FOR DETECTING DECREASE IN TIRE AIR PRESSURE AND PROGRAM FOR DETECTING DECREASE IN TIRE AIR PRESSURE

(75) Inventor: Yuji Oshiro, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 247 days.

This patent is subject to a terminal disclaimer.

(21) Appl. No.: 12/966,337

(22) Filed: Dec. 13, 2010

(65) Prior Publication Data

US 2011/0282544 A1    Nov. 17, 2011

(30) Foreign Application Priority Data

May 11, 2010   (JP) .................................. 2010-109388

(51) Int. Cl.
*G01M 17/00* (2006.01)

(52) U.S. Cl.
USPC ....... 701/29.1; 701/30.6; 701/31.1; 701/32.1; 701/33.1; 701/33.7; 701/34.2; 701/74; 701/79; 701/110; 73/146.2; 73/146.5; 340/442; 340/445; 340/446; 340/447; 280/29; 280/93.5; 324/200; 324/207.2; 324/202; 324/207.13; 324/207.23

(58) Field of Classification Search .................... 701/35, 701/29.1, 30.6, 31.1; 73/146.2; 340/442; 324/200
See application file for complete search history.

(56) References Cited

U.S. PATENT DOCUMENTS

| | | | | |
|---|---|---|---|---|
| 5,866,812 A | * | 2/1999 | Nishihara et al. | 73/146.2 |
| 6,002,327 A | * | 12/1999 | Boesch et al. | 340/442 |
| 6,064,936 A | * | 5/2000 | Nakajima | 701/71 |
| 6,681,164 B2 | * | 1/2004 | Bergerhoff et al. | 701/36 |
| 2011/0282544 A1 | * | 11/2011 | Oshiro | 701/35 |

FOREIGN PATENT DOCUMENTS

| | | |
|---|---|---|
| JP | 63-305011 A | 12/1988 |
| JP | 2003-165318 A | 6/2003 |

* cited by examiner

*Primary Examiner* — Redhwan K Mawari
(74) *Attorney, Agent, or Firm* — Birch, Stewart, Kolasch & Birch, LLP

(57) ABSTRACT

An apparatus for detecting a decrease in air pressure of a tire attached to a vehicle includes a rotation speed detection means for periodically detecting rotation speeds of tires of respective wheels of the vehicle; a rotation wheel speed ratio calculation means for calculating a rotation wheel speed ratio between front wheels and rear wheels of the vehicle; a wheel torque calculation means for calculating a wheel torque of the vehicle; an initialization means for obtaining a relation at a normal internal pressure between the wheel torque and the rotation wheel speed ratio; a comparison means for comparing the rotation wheel speed ratio with the rotation wheel speed ratio at a normal internal pressure obtained from the wheel torque and the relation; and a determination means for correcting the comparison result by a front-to-rear direction acceleration and determining whether there is a tire having a decreased air pressure or not.

21 Claims, 11 Drawing Sheets

——— Front-to-rear direction acceleration≧0.05G
——— -0.05G<Front-to-rear direction acceleration<0.05G
-------- Front-to-rear direction acceleration≦-0.05G

APPARATUS AND METHOD FOR DETECTING DECREASE IN TIRE AIR PRESSURE AND PROGRAM FOR DETECTING DECREASE IN TIRE AIR PRESSURE

TECHNICAL FIELD

The present invention relates to an apparatus and a method for detecting a decrease in tire air pressure, and a program for detecting a decrease in tire air pressure.

BACKGROUND ART

Conventionally, there has been an apparatus for detecting a decrease in tire air pressure for detecting, based on rotation (wheel speed) information regarding four tires attached to a vehicle, a decreased pressure of the tires. This apparatus uses a principle according to which a tire having a decreased pressure shows a reduced outer diameter (tire dynamic loaded radius) compared to that of tires having a normal air pressure and thus shows an increased rotation speed and an increased rotation angular velocity compared to those of other normal tires. In the case of a method of detecting a reduced internal pressure based on a relative difference in the rotation angular velocity of tires (see Patent Literature 1 for example) for example, a determination value DEL' obtained by $$DEL'=\{(F1+F4)/2-(F2+F3)/2\}/\{(F1+F2+F3+F4)/4\}\times 100(\%)$$

is used. In the formula, F1 to F4 represent rotation angular velocities of a left front wheel tire, a right front wheel tire, a left rear wheel tire, and a right rear wheel tire, respectively.

However, since the above method determines a decreased pressure by the determination value DEL' that is based on the difference in sums of the rotation angular velocities of diagonal wheels among four wheels, the method cannot determine simultaneous deflation of two front tires or simultaneous deflation of two rear tires. This causes a disadvantage where a driver continuously drives the vehicle while not knowing that the tires have a decreased pressure and thus the fuel consumption is deteriorated due to an increased rolling resistance of the tires and the tires may burst.

Thus, there have been suggested various methods in order to judge simultaneous deflation of two front tires or two rear tires described above. In the case of Patent Literature 2 for example, the rotation information of two front tires of a vehicle is compared with the rotation information of two rear tires to determine, based on the relation between the resultant comparison values and a predetermined threshold value, whether a simultaneous deflation of two front tires or two rear tires occurs or not.

CITATION LIST

Patent Literature

Patent Literature 1: Japanese Unexamined Patent Publication No. 1988-305011
Patent Literature 2: Japanese Unexamined Patent Publication No. 2003-165318

SUMMARY OF INVENTION

Technical Problem

However, the conventional methods including the method according to Patent Literature 2 are limited in that a simultaneous deflation of two front tires or two rear tires can be determined only under limited vehicle running conditions. Specifically, the method according to Patent Literature 2 determines that the simultaneous deflation of two front tires or two rear tires occurs only when the vehicle runs straight and the tires are not driven or braked. Thus, the method cannot determine the simultaneous deflation of two front tires or two rear tires when the vehicle is accelerated or decelerated.

To solve this problem, the present applicant has suggested an apparatus and a method for detecting a decrease in tire air pressure and a program for detecting a decrease in tire air pressure by which simultaneous deflation of two front wheel tires or two rear wheel tires can be determined regardless of the vehicle speed (Japanese Patent Application No. 2009-135190 (which will be hereinafter referred to as "the invention of the previous application")).

The apparatus according to the invention of the previous application includes: a rotation speed detection means for periodically detecting tire rotation speeds of the respective wheels of a vehicle; a rotation wheel speed ratio calculation means for calculating, based on rotation speed information obtained by the rotation speed detection means, a rotation wheel speed ratio between front wheels and rear wheels of the vehicle with regard to a plurality of predetermined speed regions; a wheel torque calculation means for calculating a wheel torque of the vehicle; an initialization means for obtaining, with regard to the respective speed regions, a relation at a normal internal pressure between the wheel torque and the rotation wheel speed ratio between the front wheels and the rear wheels; a storage means for storing the relation obtained by the initialization means; a comparison means for comparing, with regard to the respective speed regions, the rotation wheel speed ratio obtained by the rotation wheel speed ratio calculation means with a rotation wheel speed ratio at a normal internal pressure that is obtained from the wheel torque obtained by the wheel torque calculation means and the relation stored in the storage means; and a determination means for determining, based on a comparison result by the comparison means, whether tire air pressure is decreased or not. The initialization means is used to obtain, for the plurality of predetermined speed regions, respectively, a relation at a normal internal pressure between the wheel torque and the rotation wheel speed ratio between the front wheels and the rear wheels in advance. This relation is used to determine a decrease in the tire air pressure. Specifically, the relation between wheel torque and the rotation wheel speed ratio between the front wheels and the rear wheels obtained in advance for the respective plurality of speed regions is used to determine whether the simultaneous deflation of two front tires or two rear tires occurs or not. Thus, even when different types of tires are attached to the front wheels and the rear wheels or when significantly-different loads are applied to the front wheels and the rear wheels, an influence by the difference depending on the speed (influence on the wheel rotation speed) can be considered to thereby improve the accuracy at which a decreased pressure is determined.

The present invention has been made by further improving the invention of the previous application described above. It is an objective of the present invention to provide an apparatus and a method for detecting a decrease in tire air pressure and a program for detecting a decrease in tire air pressure that can further reduce the possibility of no alarm (at a decreased pressure) or a false alarm (at a normal internal pressure) even when different types of tires are attached to the front wheels and the rear wheels or when significantly-different loads are applied to the front wheels and the rear wheels.

Solution to Problem

In accordance with the present invention, there is provided an apparatus for detecting a decrease in air pressure of a tire (hereinafter also may be simply referred to as "detection apparatus") attached to a vehicle, comprising:

a rotation speed detection means for periodically detecting rotation speeds of tires of respective wheels of the vehicle;

a rotation wheel speed ratio calculation means for calculating, based on rotation speed information obtained by the rotation speed detection means, a rotation wheel speed ratio between front wheels and rear wheels of the vehicle with regard to a plurality of predetermined speed regions;

a wheel torque calculation means for calculating a wheel torque of the vehicle;

an initialization means for obtaining, with regard to the respective speed regions, a relation at a normal internal pressure between the wheel torque and the rotation wheel speed ratio between the front wheels and the rear wheels;

a storage means for storing the relation obtained by the initialization means;

a comparison means for comparing, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the relation stored by the storage means; and a determination means for correcting the comparison result by the comparison means by a front-to-rear direction acceleration and for determining, based on the resultant corrected value, whether there is a tire having a decreased air pressure or not.

In the detection apparatus according to the present invention, attention is focused on a point that the rotation wheel speed ratio between the front wheels and the rear wheels has a correlation not with the vehicle speed but with the wheel torque. Thus, the initialization means is used to obtain, in advance, the relation at a normal internal pressure between the wheel torque and the rotation wheel speed ratio between the front wheels and the rear wheels with regard to a plurality of predetermined speed regions. This relation is used to determine a decrease in tire air pressure. Specifically, at the vehicle running after the initialization, the rotation wheel speed ratio between the front wheels and the rear wheels obtained from the wheel torque calculated by the wheel torque calculation means and the relation (rotation wheel speed ratio in the case of a normal internal pressure), and the rotation wheel speed ratio obtained by the rotation wheel speed ratio calculation means are compared. When the resultant difference or ratio is larger than a predetermined threshold value, it is determined that a simultaneous deflation of the two front tires or the two rear tires occurs. The correlation is established in both of a case where the vehicle is running at a fixed speed and a case where the vehicle is accelerated or decelerated. Thus, the simultaneous deflation of the two front tires or the two rear tires can be detected without being limited by the vehicle speed.

The relation between wheel torque and the rotation wheel speed ratio between the front wheels and the rear wheels obtained in advance for the respective plurality of speed regions is used to determine whether the simultaneous deflation of the two front tires or two rear tires occurs or not. Thus, even when different types of tires are attached to the front wheels and the rear wheels or when significantly-different loads are applied to the front wheels and the rear wheels, an influence by the difference depending on the speed (influence on the wheel rotation speed) can be considered to thereby improve the accuracy at which a decreased pressure is determined.

Furthermore, the comparison result by the comparison means is corrected by the front-to-rear direction acceleration and whether there is a tire having a decreased air pressure or not is determined based on the resultant corrected value. This can consequently solve the problem of the variation of the determination accuracy due to a difference in the front-to-rear direction acceleration, thus further reducing the possibility of no alarm (at a decreased pressure) or a false alarm (at a normal internal pressure).

The detection apparatus can be configured so that:

the initialization means includes a means for obtaining, with regard to the respective speed regions, a relation at a normal internal pressure between the wheel torque and the rotation wheel speed ratio between the front wheels and the rear wheels based on a regression line, and the comparison means compares, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the regression line. In this case, the regression line obtained in advance for the respective speed regions can be used to calculate a rotation wheel speed ratio at a certain wheel torque. By comparing this rotation wheel speed ratio with the rotation wheel speed ratio obtained by the rotation wheel speed ratio calculation means, a simultaneous deflation of two wheels on the same axis can be detected.

The detection apparatus can be configured so that:

the initialization means includes a means for setting a plurality of wheel torque regions with regard to the respective speed regions, and for calculating, at a normal internal pressure, an average value, for the respective wheel torque regions, of the rotation wheel speed ratios between the front wheels and the rear wheels, and the comparison means compares, with regard to the respective speed regions, the rotation wheel speed ratio obtained by the rotation wheel speed ratio calculation means with an average value of the rotation wheel speed ratio in a wheel torque region including the wheel torque obtained by the wheel torque calculation means. In this case, by comparing the average value of the rotation wheel speed ratio in a wheel torque region including a certain wheel torque calculated in advance for the respective speed regions with the rotation wheel speed ratio obtained by the rotation wheel speed ratio calculation means, two wheels on the same axis having a decreased pressure can be detected.

The detection apparatus can be configured so that:

the initialization means includes a means for setting a plurality of wheel torque regions with regard to the respective speed regions and for calculating, at a normal internal pressure, an average wheel torque value of the respective wheel torque regions and an average value of the rotation wheel speed ratios between the front wheels and the rear wheels and, a means for obtaining a reference straight line connecting the average values of the respective regions, and the comparison means compares, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the reference straight line. In this case, the reference straight line obtained in advance for the respective speed regions can be used to calculate the rotation wheel speed ratio at a certain wheel torque. By comparing this rotation wheel speed ratio with the rotation wheel speed ratio obtained by the rotation wheel speed ratio calculation means, two wheels on the same axis having a decreased pressure can be detected.

The initialization means can be configured to include a means for obtaining by a regression line, with regard to the respective speed regions, a relation at a normal internal pressure between a wheel torque and the rotation wheel speed ratio between the front wheels and the rear wheels to calculate, after the regression line is derived, a correction amount by the front-to-rear direction acceleration based on the front-to-rear direction acceleration and the displacement from the regression line.

The initialization means can be configured to include a means for setting a plurality of wheel torque regions for the respective speed regions to calculate, at a normal internal pressure, an average value of rotation wheel speed ratios between the front wheels and the rear wheels with regard to the respective wheel torque regions to calculate, after the average value is derived, a correction amount by the front-to-rear direction acceleration based on the front-to-rear direction acceleration and the displacement from the average value.

The initialization means can be configured to include a means for setting a plurality of wheel torque regions for the respective speed regions to calculate, at a normal internal pressure and with regard to the respective wheel torque regions, an average wheel torque value and an average rotation wheel speed ratio between the front wheels and the rear wheels and a means for calculating a reference line connecting the average values of the respective regions to calculate, after the reference line is derived, based on the front-to-rear direction acceleration and the displacement from the reference line, a correction amount by the front-to-rear direction acceleration.

In accordance with the present invention, there is also provided a method for detecting a decrease in air pressure (hereinafter also may be simply referred to as "detection method") of a tire attached to a vehicle, comprising:

a rotation speed detection step of periodically detecting rotation speeds of tires of respective wheels of the vehicle;

a rotation wheel speed ratio calculation step of calculating, based on rotation speed information obtained in the rotation speed detection step, a rotation wheel speed ratio between front wheels and rear wheels of the vehicle with regard to a plurality of predetermined speed regions;

a wheel torque calculation step of calculating a wheel torque of the vehicle;

an initialization step of obtaining, with regard to the respective speed regions, a relation at a normal internal pressure between the wheel torque and the rotation wheel speed ratio between the front wheels and the rear wheels;

a storage step of storing the relation obtained in the initialization step;

a comparison step of comparing, with regard to the respective speed regions, the rotation wheel speed ratio with the rotation wheel speed ratio at a normal internal pressure obtained from the wheel torque and the stored relation; and a determination step for correcting the comparison result in the comparison step by a front-to-rear direction acceleration and for determining, based on the resultant corrected value, whether there is a tire having a decreased air pressure or not.

In the detection method according to the present invention, attention is focused on a point that the rotation wheel speed ratio between the front wheels and the rear wheels has a correlation not with the vehicle speed but with the wheel torque. Thus, the initialization means is used to obtain, in advance, the relation at a normal internal pressure between the wheel torque and the rotation wheel speed ratio between the front wheels and the rear wheels with regard to a plurality of predetermined speed regions. This relation is used to determine a decrease in the tire air pressure. Specifically, at the vehicle running after the initialization, the rotation wheel speed ratio between the front wheels and the rear wheels obtained from the wheel torque calculated by the wheel torque calculation means and the relation (rotation wheel speed ratio in the case of a normal internal pressure), and the rotation wheel speed ratio obtained by the rotation wheel speed ratio calculation means are compared. When the resultant difference or ratio is larger than a predetermined threshold value, it is determined that a simultaneous deflation of the two front tires or the two rear tires occurs. The correlation is established in both of a case where the vehicle is running at a fixed speed and a case where the vehicle is accelerated or decelerated. Thus, the simultaneous deflation of the two front tires or the two rear tires can be detected without being limited by the vehicle speed.

The relation between wheel torque and the rotation wheel speed ratio between the front wheels and the rear wheels obtained in advance for the respective plurality of speed regions is used to determine whether the simultaneous deflation of the two front tires or two rear tires occurs or not. Thus, even when different types of tires are attached to the front wheels and the rear wheels or when significantly-different loads are applied to the front wheels and the rear wheels, an influence by the difference depending on the speed (influence on the wheel rotation speed) can be considered to thereby improve the accuracy at which a decreased pressure is determined.

Furthermore, the comparison result by the comparison means is corrected by the front-to-rear direction acceleration and whether there is a tire having a decreased air pressure or not is determined based on the resultant corrected value. This can consequently solve the problem of the variation of the determination accuracy due to a difference in the front-to-rear direction acceleration, thus further reducing the possibility of no alarm (at a decreased pressure) or a false alarm (at a normal internal pressure).

The detection method can be configured so that:

the initialization step includes a step of obtaining, with regard to the respective speed regions, a relation at a normal internal pressure between the wheel torque and the rotation wheel speed ratio between the front wheels and the rear wheels based on a regression line, and the comparison step compares, with regard to the respective speed regions, the rotation wheel speed ratio obtained in the rotation wheel speed ratio calculation step with the rotation wheel speed ratio at a normal internal pressure obtained from the wheel torque obtained in the wheel torque calculation step and the regression line.

The detection method can be configured so that:

the initialization step includes an average value calculation step of setting a plurality of wheel torque regions with regard to the respective speed regions and of calculating, at a normal internal pressure, an average value, for the respective wheel torque regions, of the rotation wheel speed ratios between the front wheels and the rear wheels, and the comparison step compares, with regard to the respective speed regions, the rotation wheel speed ratio obtained in the rotation wheel speed ratio calculation step with an average value of the rotation wheel speed ratio in a wheel torque region including the wheel torque obtained in the wheel torque calculation step.

The detection method can be configured so that:

the initialization step includes an average value calculation step of setting a plurality of wheel torque regions with regard to the respective speed regions and of calculating, at a normal internal pressure, an average wheel torque value of the respective wheel torque regions and an average value of the rotation wheel speed ratios between the front wheels and the rear wheels and, a step of obtaining a reference straight line connecting the average values of the respective regions, and the comparison step compares, with regard to the respective speed regions, the rotation wheel speed ratio obtained in the rotation wheel speed ratio calculation step with the rotation wheel speed ratio at a normal internal pressure obtained from the wheel torque obtained in the wheel torque calculation step and the reference straight line.

The initialization step can be configured to include a step for obtaining by a regression line, with regard to the respective speed regions, a relation at a normal internal pressure between a wheel torque and the rotation wheel speed ratio between the front wheels and the rear wheels to calculate, after the regression line is derived, a correction amount by the front-to-rear direction acceleration based on the front-to-rear direction acceleration and the displacement from the regression line.

The initialization step can be configured to include a step for setting a plurality of wheel torque regions for the respective speed regions to calculate, at a normal internal pressure, an average value of rotation wheel speed ratios between the front wheels and the rear wheels with regard to the respective wheel torque regions to calculate, after the average value is derived, a correction amount by the front-to-rear direction acceleration based on the front-to-rear direction acceleration and the displacement from the average value.

The initialization step can be configured to include a step for setting a plurality of wheel torque regions for the respective speed regions to calculate, at a normal internal pressure and with regard to the respective wheel torque regions, an average wheel torque value and an average rotation wheel speed ratio between the front wheels and the rear wheels and a step for obtaining a reference line connecting the average values of the respective regions to calculate, after the reference line is derived, based on the front-to-rear direction acceleration and the displacement from the reference line, a correction amount by the front-to-rear direction acceleration.

In accordance with the present invention, there is further provided a program for detecting a decrease in air pressure of a tire (hereinafter also may be simply referred to as "program") that causes, in order to detect a decrease in air pressure of a tire attached to a vehicle, a computer to function as: a rotation wheel speed ratio calculation means for calculating, based on rotation speed information obtained by a rotation speed detection means for periodically detecting rotation speeds of tires of respective wheels of the vehicle, a rotation wheel speed ratio between front wheels and rear wheels of the vehicle with regard to a plurality of predetermined speed regions; a wheel torque calculation means for calculating a wheel torque of the vehicle; an initialization means for obtaining a relation at a normal internal pressure between the wheel torque and the rotation wheel speed ratio between the front wheels and the rear wheels with regard to the respective speed regions; a comparison means for comparing, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the relation obtained by the initialization means; and a determination means for correcting the comparison result by the comparison means by a front-to-rear direction acceleration and for determining, based on the resultant corrected value, whether there is a tire having a decreased air pressure or not.

The program can be configured so that:

the initialization means includes a means for obtaining, with regard to the respective speed regions, a relation at a normal internal pressure between the wheel torque and the rotation wheel speed ratio between the front wheels and the rear wheels based on a regression line, and the comparison means compares, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the regression line.

The program can be configured so that:

the initialization means includes a means for setting a plurality of wheel torque regions with regard to the respective speed regions and for calculating, at a normal internal pressure, an average value, for the respective wheel torque regions, of the rotation wheel speed ratios between the front wheels and the rear wheels, and the comparison means compares, with regard to the respective speed regions, the rotation wheel speed ratio obtained by the rotation wheel speed ratio calculation means with an average value of the rotation wheel speed ratio in a wheel torque region including the wheel torque obtained by the wheel torque calculation means.

The program can be configured so that:

the initialization means includes a means for setting a plurality of wheel torque regions with regard to the respective speed regions and for calculating, at a normal internal pressure, an average wheel torque value of the respective wheel torque regions and an average value of the rotation wheel speed ratios between the front wheels and the rear wheels and, a means for obtaining a reference straight line connecting the average values of the respective regions, and the comparison means compares, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the reference straight line.

The initialization means can be configured to include a means for calculating by a regression line, with regard to the respective speed regions, a relation at a normal internal pressure between a wheel torque and the rotation wheel speed ratio between the front wheels and the rear wheels to calculate, after the regression line is derived, a correction amount by the front-to-rear direction acceleration based on the front-to-rear direction acceleration and the displacement from the regression line.

The initialization means can be configured to include a means for setting a plurality of wheel torque regions for the respective speed regions to calculate, at a normal internal pressure, an average value of rotation wheel speed ratios between the front wheels and the rear wheels with regard to the respective wheel torque regions to calculate, after the average value is derived, a correction amount by the front-to-rear direction acceleration based on the front-to-rear direction acceleration and the displacement from the average value.

The initialization means can be configured to include a means for setting a plurality of wheel torque regions for the respective speed regions to calculate, at a normal internal pressure and with regard to the respective wheel torque regions, an average wheel torque value and an average rotation wheel speed ratio between the front wheels and the rear wheels and a means for obtaining a reference line connecting the average values of the respective regions to calculate, after the reference line is derived, based on the front-to-rear direction acceleration and the displacement from the reference line, a correction amount by the front-to-rear direction acceleration.

Advantageous Effects of Invention

According to the detection apparatus and method, and program of the present invention, even when front wheel tires are of the type that is different from the type of rear wheels or when significantly-different loads are applied to the front wheel tires and rear wheel tires, the possibility of no alarm (at a decreased pressure) or a false report (at a normal internal pressure) can be further reduced.

DESCRIPTION OF EMBODIMENTS

Hereinafter, with reference to the attached drawings, an embodiment of a detection apparatus and method, and a program for detecting a decrease in air pressure of a tire of the present invention will be described in detail.

Figure 1:
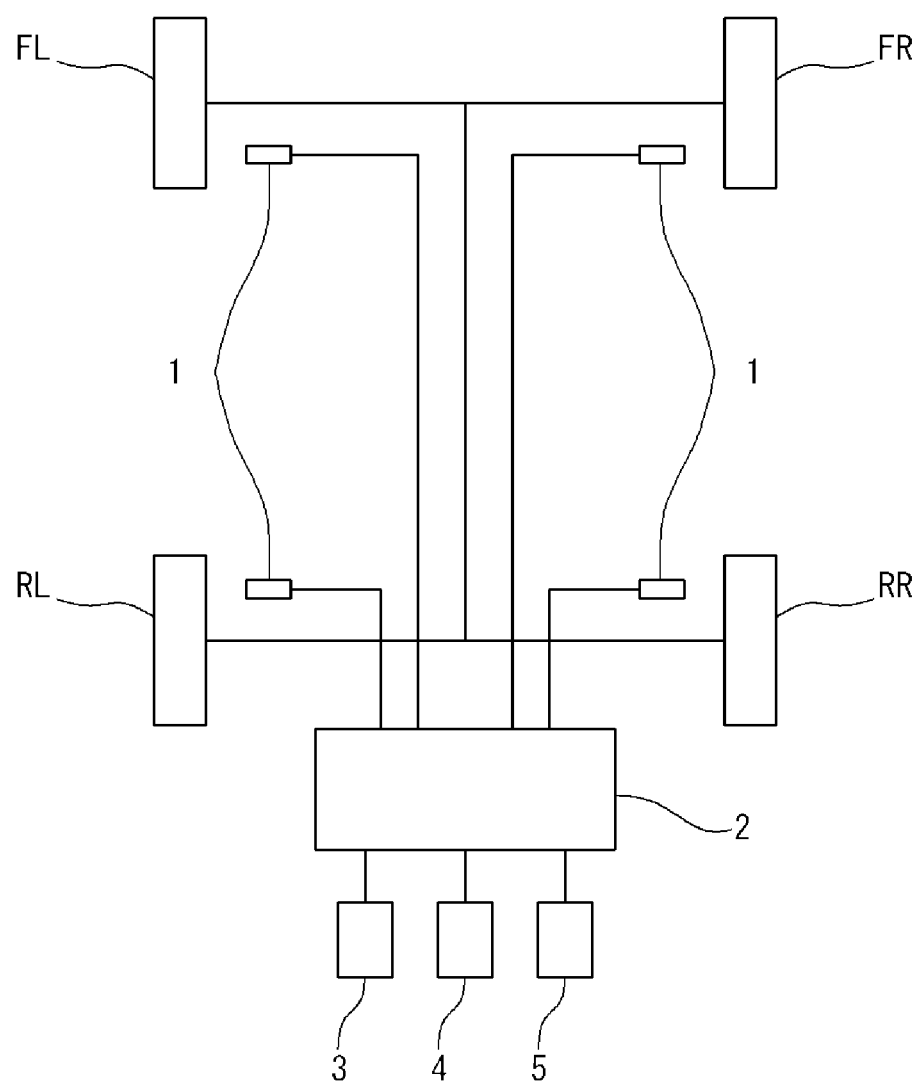
FIG. 1 is a block diagram illustrating one embodiment of a detection apparatus of the present invention.

As shown in FIG. 1, a detection apparatus according to the first embodiment of the present invention includes a normal wheel speed detection means (rotation speed detection means) 1 in order to detect the rotation speeds of four tires provided in a four-wheel vehicle of a left front wheel (FL), a right front wheel (FR), a left rear wheel (RL), and a right rear wheel (RR). The normal wheel speed detection means (rotation speed detection means) 1 is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as a one that generates power using rotation as in a dynamo to measure an angular velocity and a wheel speed based on the voltage of the generated power. The output from the wheel speed detection means 1 is given to a control unit 2 that is a computer such as ABS. Connected to the control unit 2 are a display unit 3 comprising a liquid crystal display element, a plasma display element or CRT for example for displaying a tire having a decreased pressure; an initialization button 4 that can be operated by a driver; and an alarm unit 5 for notifying a driver of a tire having a decreased pressure.

Figure 2:
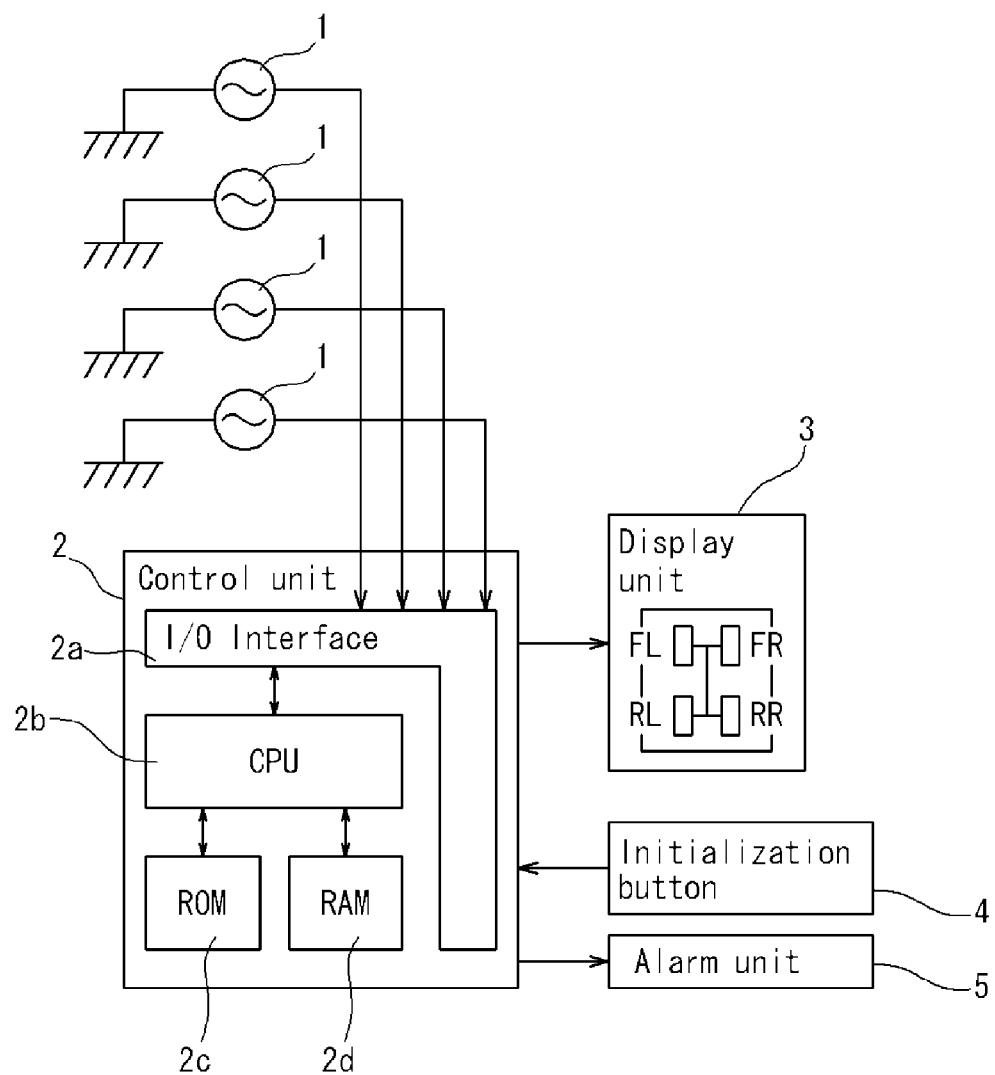
FIG. 2 is a block diagram illustrating an electric configuration of the detection apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of the CPU 2b; and a RAM 2d into which data is temporarily written or from which the written data is read out when the CPU 2b performs a control operation.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, angular velocities of the respective tires at every predetermined sampling cycle $\Delta T(sec)$ (e.g., $\Delta T=0.05$ second).

The detection apparatus according to the present embodiment comprises: a wheel speed detection means (rotation speed detection means) 1 for periodically detecting the tire rotation speeds of respective wheels of the vehicle; a rotation wheel speed ratio calculation means for calculating, based on rotation speed information obtained by the rotation speed detection means, a rotation wheel speed ratio between front wheels and rear wheels of the vehicle with regard to a plurality of predetermined speed regions; a wheel torque calculation means for calculating a wheel torque of the vehicle; an initialization means for obtaining, with regard to the respective speed regions, a relation at a normal internal pressure between the wheel torque and the rotation wheel speed ratio between the front wheels and the rear wheels; a storage means for storing the relation obtained by the initialization means; a comparison means for comparing, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the relation stored in the storage means; and a determination means for correcting the comparison result by this comparison means by a front-to-rear direction acceleration and for determining, based on the resultant corrected value, whether there is a tire having a decreased air pressure or not. The program for detecting a decrease in a tire air pressure causes the control unit 2 to function as the rotation wheel speed ratio calculation means, the wheel torque calculation means, the initialization means, the comparison means, and the determination means.

In the present invention, the apparatus is initialized while tires having a predetermined air pressure (normal pressure) being attached to the vehicle. The result thereof is stored in the RAM 2d of the control unit 2 (the storage means). This initialization is performed by the CPU 2b functioning as the initialization means. Specifically, based on the rotation speed information of the respective wheel tires of the vehicle obtained from the wheel speed detection means 1, the rotation wheel speeds of the respective four wheel tires are calculated. Then, based on these rotation wheel speeds, the rotation wheel speed ratio (DEL) between the front wheels and the rear wheels is calculated based on, for example, $$DEL=\{(FL+FR)/(RL+RR)-1\}\times 100(\%) \quad (1).$$

In this formula, FL, FR, RL, and RR represent the rotation wheel speeds of the left front wheel tire, the right front wheel tire, the left rear wheel tire, and the right rear wheel tire, respectively. The formula for calculating DEL is not limited to the formula (1) and also can be, for example, the following formula of:

$$DEL=\{(FL+FR)/2-(RL+RR)/2\}/\{(FL+FR+RL+RR)/4\}\times 100(\%) \quad (2)$$

The wheel torque can be derived from the engine torque (T) and the rotation number (R) obtained from an engine control apparatus for example. For example, the wheel torque (WT) per one driving wheel can be represented by the following formula (3).

$$WT=(T\times R)/\text{rotation number of driving wheel/the number of driving wheels} \quad (3)$$

In this formula (3), (R/rotation number of driving wheel) can be calculated from a gear ratio or a shift position (which means L, 2, and 3 . . . of the variable speed gear of the vehicle and tells, in the case of an automatic vehicle, which gear is used to run the vehicle. If the respective gear ratios are stored in the storage means in advance, only the shift position is sufficient to know (R/rotation number of driving wheel)).

Then, the storage means stores therein the relation between the rotation wheel speed ratio between the front wheels and the rear wheels and the wheel torque calculated in the manner as described above. It is noted that, in the present invention, with regard to the predetermined plurality of speed regions, the rotation speed ratio of the front wheels and the rear wheels is calculated due to the following reason.

Figure 3:
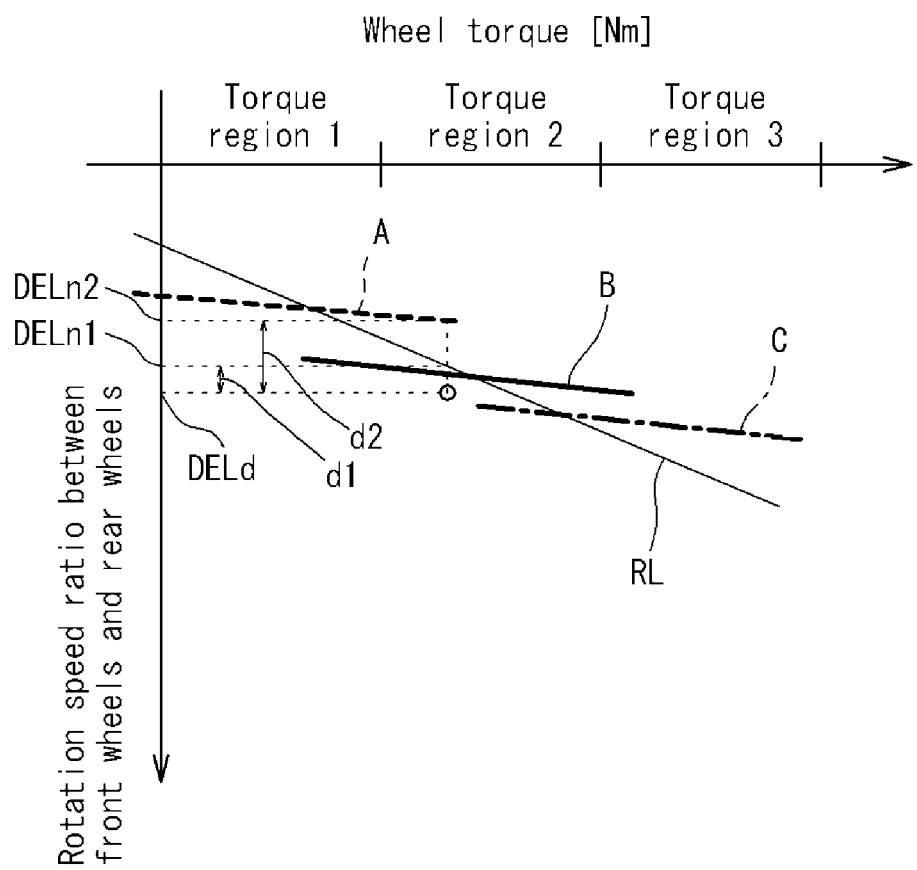
FIG. 3 shows the relation between the DEL and the wheel torque when front wheels and rear wheels have different tires.

The relation between the wheel torque and the rotation speed ratio between the front wheels and the rear wheels draws, when the same tires are attached to the vehicle and when a difference among loads applied to the front wheel tires and the rear wheel tires is small, a substantially one straight line RL regardless of the vehicle speed, as shown by the thin solid line of FIG. 3. Thus, if such a straight line (regression line) is obtained in the initialization step performed at the normal internal pressure and this straight line is stored, there can be determined a simultaneous deflation of the two front tires or two rear tires based on a difference from the straight line.

However, when different tires are attached to the front wheels and the rear wheels or when significantly-different loads are applied to the front wheels and the rear wheels even if the same tires are attached to the front wheels and the rear wheels (e.g., when a heavy baggage is loaded in the trunk), the tire swells due to the centrifugal force of the tires to a different level depending on the vehicle speed. Thus, the relation between the wheel torque and the rotation speed ratio between the front wheels and the rear wheels does not draw a single straight line. This prevents, when a single straight line is forcedly obtained and a decreased pressure is tried to be calculated based on thus obtained straight line, an alarm from being issued despite of the existence of a decreased pressure (no alarm) or this causes an alarm to be issued despite of the existence of a normal internal pressure (false alarm).

Thus, the problem of no alarm or a false alarm can be reduced in the above-described case where front wheel tires are of the type that is different from the type of rear wheels by setting the plurality of speed regions and by calculating, with regard to the respective speed regions, the relation between the rotation speed ratio of the front wheels and the rear wheels and the wheel torque.

FIG. 3 is a schematic view illustrating the relation between the wheel torque and the rotation speed ratio between the front wheels and the rear wheels when different tires are attached to the front wheels and the rear wheels. In FIG. 3, a thin solid line shows the regression line RL calculated based on the data obtained for all vehicle speeds, a thick broken line A shows the regression line calculated based on the data obtained from the low-speed region (e.g., region up to 100 km/h), a thick solid line B shows the regression line calculated based on the data obtained from the medium-speed region (e.g., region from 100 to 150 km/h), and a thick alternate long and short dash line C shows the regression line calculated based on the data obtained from the high-speed region (e.g., region from 150 to 200 km/h). DELd shows a rotation speed ratio between the front wheels and the rear wheels at a certain speed when both of the two front wheels have a 30%-decreased pressure. The low-speed region corresponds to the low torque region (torque region 1). The medium-speed region corresponds to the medium torque region (torque region 2). The high-speed region corresponds to the high torque region (torque region 3).

As shown in FIG. 3, when one regression line RL is obtained regardless of the vehicle speed, a small difference d1 is caused between the rotation speed ratio DELn1 between the front wheels and the rear wheels at a normal pressure that is obtained based on the regression line RL and the rotation speed ratio DELd between the front wheels and the rear wheels when the two front tires have a 30%-decreased pressure. Thus, it is not determined that the two front tires have a decreased pressure and no alarm is issued. In contrast with this, when the regression line (regression line shown by the thick broken line A) obtained for each speed region is used, a large difference d2 is caused between the rotation speed ratio DELn2 between the front wheels and the rear wheels at a normal internal pressure that is obtained based on the regression line and the rotation speed ratio DELd between the front wheels and the rear wheels when the two front tires have a 30%-decreased pressure. Thus, it can be determined that the two front tires have a decreased pressure.

Figure 4:
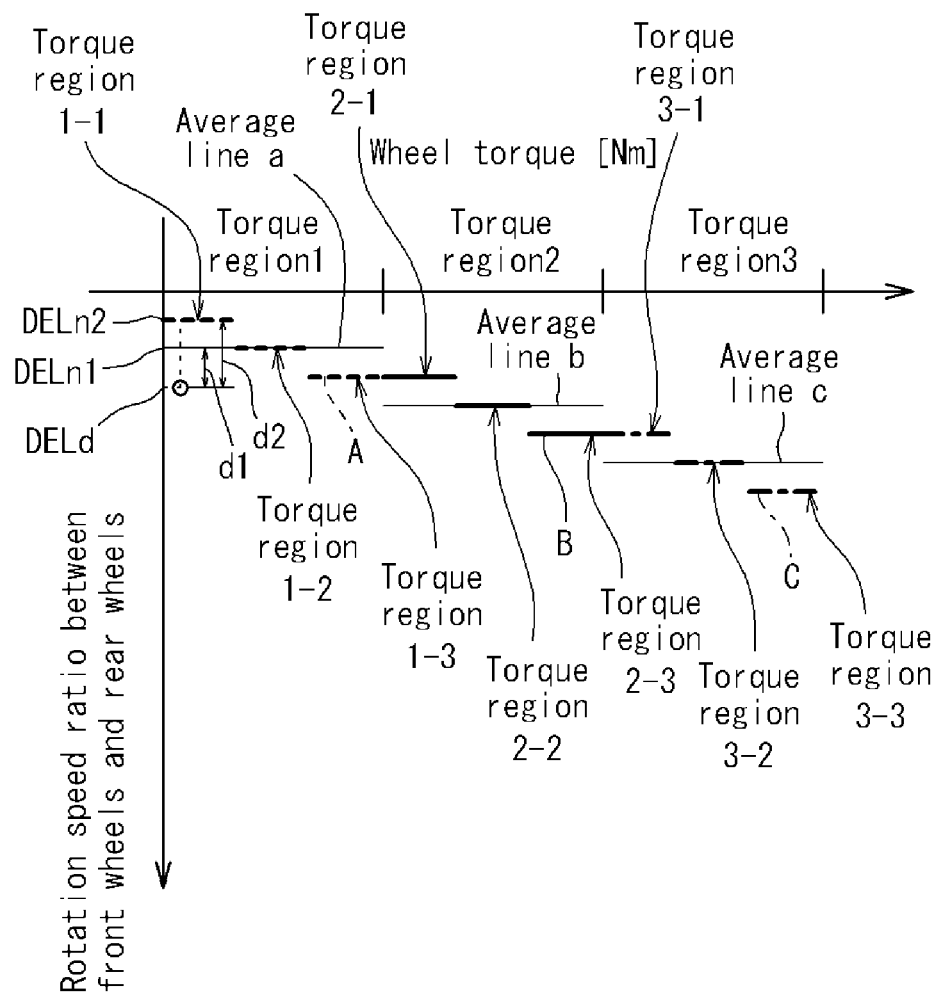
FIG. 4 shows the relation between the DEL and the wheel torque when front wheels and rear wheels have different tires.

FIG. 4 is a schematic view as in FIG. 3 that shows the relation between the wheel torque and the rotation speed ratio between the front wheels and the rear wheels when different types of tires are attached to the front wheels and the rear wheels. In FIG. 4, the thin solid lines represent the average lines (a straight line passing the average value of the rotation speed ratios of the front wheels and the rear wheels) with regard to the respective torque regions (torque region 1, torque region 2, and torque region 3) calculated based on the data obtained for all vehicle speeds. The average line a represents a line passing the average value calculated for the torque region 1 (torque region 1-1, torque region 1-2, and torque region 1-3) corresponding to the low-speed region (e.g., a region up to 100 km/h). The average line b represents a line passing the average value calculated for the torque region 2 (torque region 2-1, torque region 2-2, and torque region 2-3) corresponding to the medium-speed region (e.g., a region from 100 to 150 km/h). The average line c represents a line passing the average value calculated for the torque region 3 (torque region 3-1, torque region 3-2, and torque region 3-3) corresponding to the high-speed region (e.g., a region from 150 to 200 km/h).

The thick broken line A represents an average line passing the average value with regard to the respective wheel torque regions of the low-speed region (torque region 1-1, torque region 1-2, and torque region 1-3) calculated based on the data obtained for the low-speed region. The thick solid line B represents an average line passing the average value with regard to the respective wheel torque regions of the medium-speed region (torque region 2-1, torque region 2-2, and torque region 2-3) calculated based on the data obtained for the medium-speed region. The thick alternate long and short dash line C represents an average line passing the average value with regard to the respective wheel torque regions of the high-speed region (torque region 3-1, torque region 3-2, and torque region 3-3) calculated based on the data obtained for the high-speed region. DELd represents a rotation speed ratio between the front wheels and the rear wheels at a certain speed when both of the two front wheels have a 30%-decreased pressure.

As shown in FIG. 4, when one average line (average line a in the case of the torque region 1) in the respective torque regions (torque region 1, torque region 2 and torque region 3) is obtained, this results in a small difference d1 between the rotation speed ratio DELn1 between the front wheels and the rear wheels at a normal internal pressure calculated by the average line a and the rotation speed ratio DELd between the front wheels and the rear wheels when both of the two front wheels have a 30%-decreased pressure. This consequently fails to determine a decreased pressure, thus resulting in no alarm. On the other hand, when using the average line (the straight line shown by the thick broken line A) calculated in the low-speed region with regard to the respective torque regions (torque regions 1-1, 1-2, and 1-3), this results in the large difference d2 between the rotation speed ratio DELn2 between the front wheels and the rear wheels at a normal internal pressure that is calculated based on the average line and the rotation speed ratio DELd between the front wheels and the rear wheels when both of the two front wheels have a 30%-decreased pressure. Thus, a decreased pressure can be determined.

Figure 5:
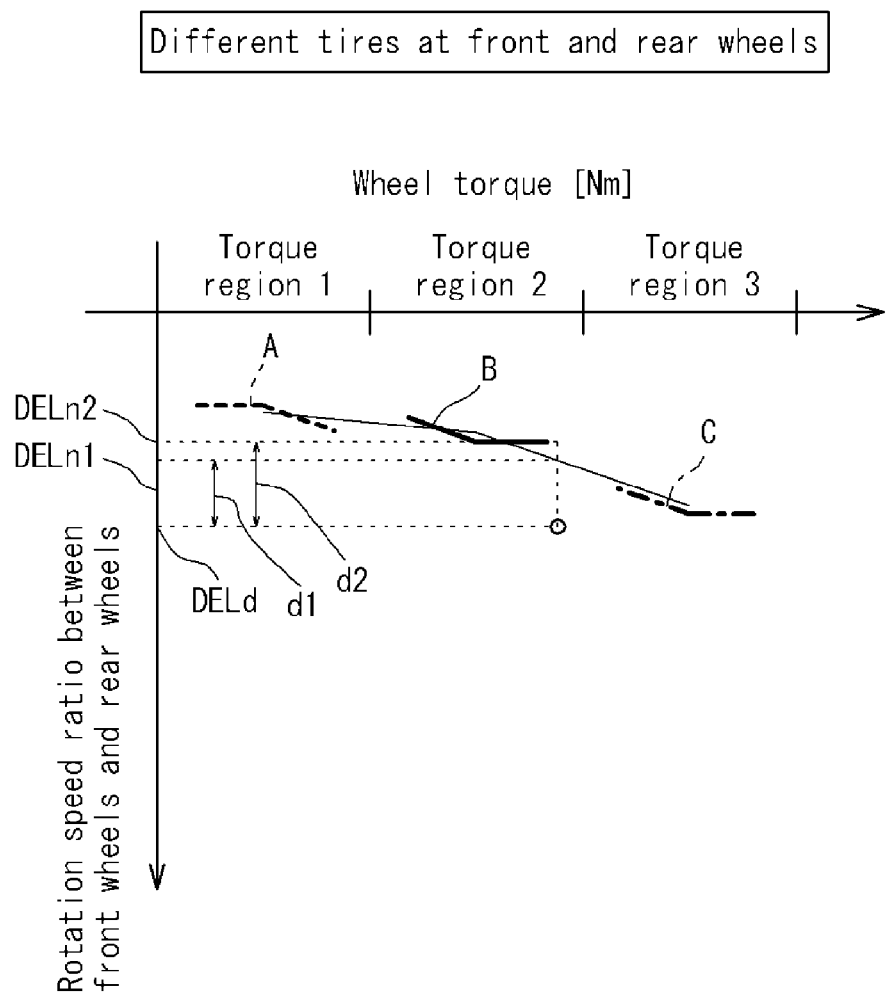
FIG. 5 shows the relation between the DEL and the wheel torque when front wheels and rear wheels have different tires.

FIG. 5 schematically illustrates, as in FIG. 3, the relation between the wheel torque and the rotation speed ratio between the front wheels and the rear wheels when the front wheel tires are of the type that is different from the type of the rear wheels. In FIG. 5, the thin solid line represents the average line obtained by connecting the average values of the rotation speed ratios of the front wheels and the rear wheels with regard to the respective torque regions (torque region 1, torque region 2, and torque region 3) calculated based on the data obtained for all vehicle speeds. The thick broken line A represents an average line obtained by connecting the average values with regard to the respective wheel torque regions (torque region 1-1, torque region 1-2, and torque region 1-3) calculated based on the data obtained for the low-speed region (e.g., a region up to 100 km/h). The thick solid line B represents an average line obtained by connecting the average values with regard to the respective wheel torque regions (torque region 2-1, torque region 2-2, and torque region 2-3) calculated based on the data obtained for the medium-speed region (e.g., a region from 100 to 150 km/h). The thick alternate long and short dash line C represents an average line obtained by connecting the average values with regard to the respective wheel torque regions (torque region 2-1, torque region 2-2, and torque region 2-3) calculated based on the data obtained for the high-speed region (e.g., a region from 150 to 200 km/h). DELd represents a rotation speed ratio between the front wheels and the rear wheels at a certain speed when both of the two front wheels have a 30%-decreased pressure.

As shown in FIG. 5, when an average line obtained by connecting the average values of the rotation speed ratio between the front wheels and the rear wheels for the respective torque regions (torque region 1, torque region 2, and torque region 3) is calculated, this results in the small difference d1 between the rotation speed ratio DELn1 between the front wheels and the rear wheels at a normal internal pressure calculated by the average line and the rotation speed ratio DELd between the front wheels and the rear wheels when both of the two front wheels have a 30%-decreased pressure. This consequently fails to determine a decreased pressure, thus resulting in no alarm. On the other hand, when using the average line (the line shown by the thick broken line A obtained by connecting the average values of the torque regions 1-1, 1-2, and 1-3 in the case of the low-speed region), this results in the large difference d2 between the rotation speed ratio DELn2 between the front wheels and the rear wheels at a normal internal pressure that is calculated based on the average line and the rotation speed ratio DELd between the front wheels and the rear wheels when both of the two front wheels have a 30%-decreased pressure. Thus, a decreased pressure can be determined.

Figure 6:
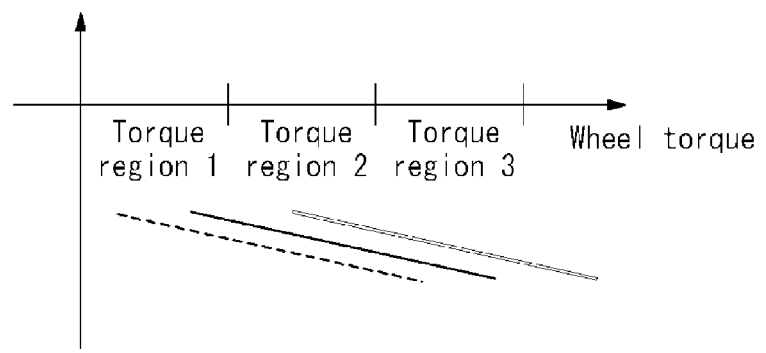
FIG. 6 illustrates the relation between a wheel torque and a rotation speed ratio between front wheels and rear wheels.
Figure 7:
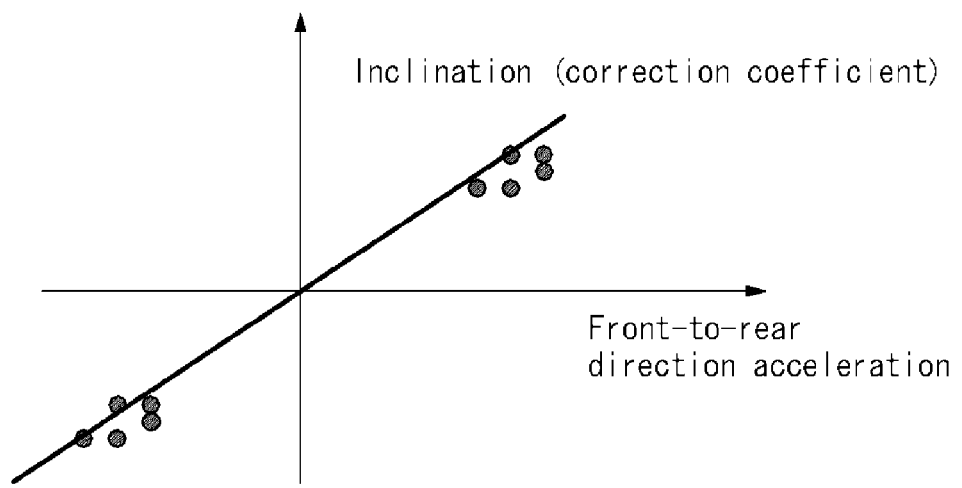
FIG. 7 illustrates the relation between the wheel torque and the rotation speed ratio between the front wheels and the rear wheels after the correction of the wheel torque.

By the way, the wheel torque and the rotation speed ratio between the front wheels and the rear wheels are different, as shown in FIG. 6, depending on the magnitude of the front-to-rear direction acceleration of the vehicle. Specifically, with an increase of the front-to-rear direction acceleration, the rotation speed ratio between the front wheels and the rear wheels also increases. In the present invention, in order to correct this, a correction coefficient used for correction by the front-to-rear direction acceleration is calculated as shown in FIG. 7. In FIG. 7, the vertical axis represents the rotation speed ratio between the front wheels and the rear wheels after the correction of the wheel torque and the horizontal axis represents the front-to-rear direction acceleration. The rotation speed ratio between the front wheels and the rear wheels after the correction of the wheel torque can be calculated in the manner as described below. First, during the initialization (at a normal internal pressure), the rotation speed ratio between the front wheels and the rear wheels and the wheel torque are plotted and a regression line for example is stored. Thereafter, a difference between a point on the regression line at a certain wheel torque and the rotation speed ratio between the front wheels and the rear wheels is assumed as the rotation speed ratio between the front wheels and the rear wheels after the correction of the wheel torque. In other words, a displacement from the regression line (how much the discrepancy is) is assumed as the rotation speed ratio between the front wheels and the rear wheels after the correction of the wheel torque.

Then, the rotation speed ratio between the front wheels and the rear wheels after the correction of the wheel torque and the front-to-rear direction acceleration are plotted. The resultant inclination of the straight line (regression line) is assumed as the correction coefficient.

Figure 8:
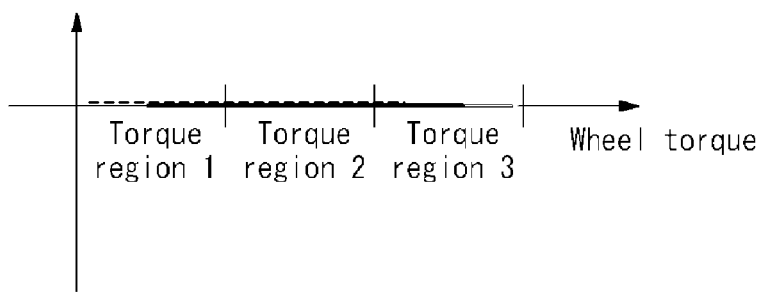
FIG. 8 illustrates the relation between the rotation speed ratio between the front wheels and the rear wheels corrected by the wheel torque and the front-to-rear direction acceleration, and the wheel torque.

Next, when the rotation speed ratio between the front wheels and the rear wheels after the correction of the wheel torque is corrected by the front-to-rear direction acceleration, a substantially single straight line is obtained as shown in FIG. 8. In FIG. 8, the rotation speed ratio between the front wheels and the rear wheels after the correction by the front-to-rear direction acceleration (corrected value) and the wheel torque are plotted. The corrected value can be calculated by the following formula (4).

Corrected value=the rotation speed ratio between the front wheels and the rear wheels after the correction of the wheel torque−the correction coefficient×the front-to-rear direction acceleration (4)

During the initialization, this correction coefficient is calculated. During an actual running, the correction coefficient is used to calculate the correction amount (the correction coefficient×the front-to-rear direction acceleration). Then, the corrected value is calculated by deducting the correction amount from the rotation speed ratio between the front wheels and the rear wheels after the correction of the wheel torque. When the calculated corrected value is larger than a predetermined threshold value, it is determined that the two coaxial front wheels or the two coaxial rear wheels have a decreased pressure, thus issuing an alarm. The threshold value as described above can be calculated in advance by an experimental running using a vehicle in which both of the front wheels or both of the rear wheels have a pressure decreased by 30% from a normal internal pressure for example.

In the present embodiment, during the initialization, with regard to the respective plurality of speed regions, the regression line (which shows a correlation between the rotation speed ratio between the front wheels and the rear wheels and the wheel torque) is drawn and correction coefficient is calculated for the respective speed regions. Furthermore, as shown in FIG. 4, when a plurality of wheel torque regions are set for the respective speed regions, the correction coefficient is calculated based on the displacement from the average value of the rotation speed ratio between the front wheels and the rear wheels calculated for the respective wheel torque regions and the front-to-rear direction acceleration. Furthermore, as shown in FIG. 5, when a plurality of wheel torque regions are set for the respective speed regions and when a reference line is obtained that connects the average wheel torque values calculated for the respective wheel torque regions and the average value of the rotation speed ratio between the front wheels and the rear wheels, the correction coefficient is calculated based on the displacement from the reference line and the front-to-rear direction acceleration.

EXAMPLE

Next, the following section will describe an example of the detection method of the present invention. However, the present invention is not limited to such an example only.

A running experiment was carried out by an FR vehicle having summer tires among which front wheel tires were 255/35R19 and rear wheel tires were /285/30R19. The vehicle included two passengers including a driver. The running conditions were that the vehicle was allowed to run on a general road with a different speed so as to cause the variation of the wheel torque value at a normal internal pressure to thereby calculate an effective regression line.

Figure 9:
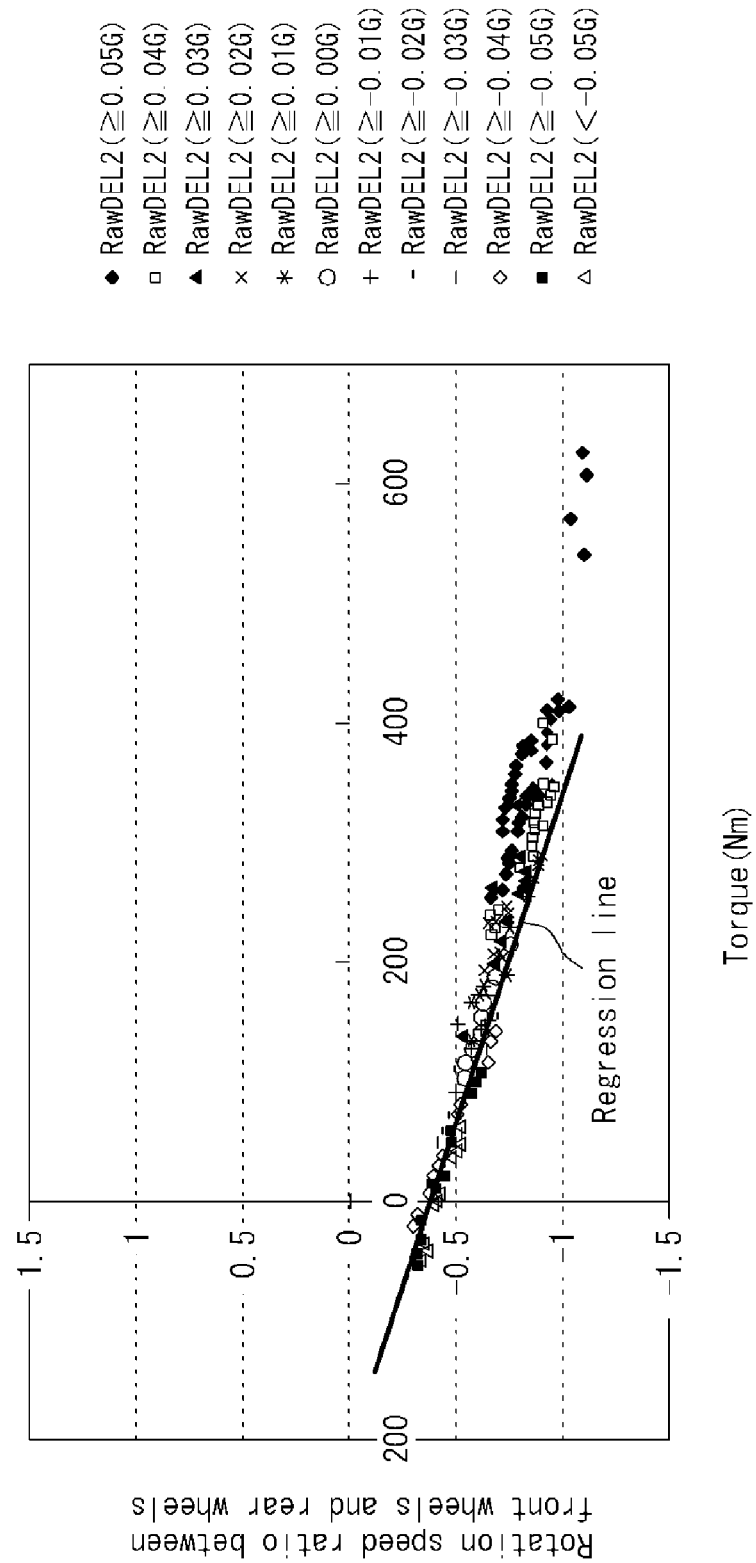
FIG. 9 illustrates the relation between the wheel torque and the rotation speed ratio between the front wheels and the rear wheels in Example.

FIG. 9 shows the relation between the wheel torque and the rotation speed ratio between the front wheels and the rear wheels. It can be seen that the front-to-rear direction acceleration causes the rotation speed ratio between the front wheels and the rear wheels to be different.

Figure 10:
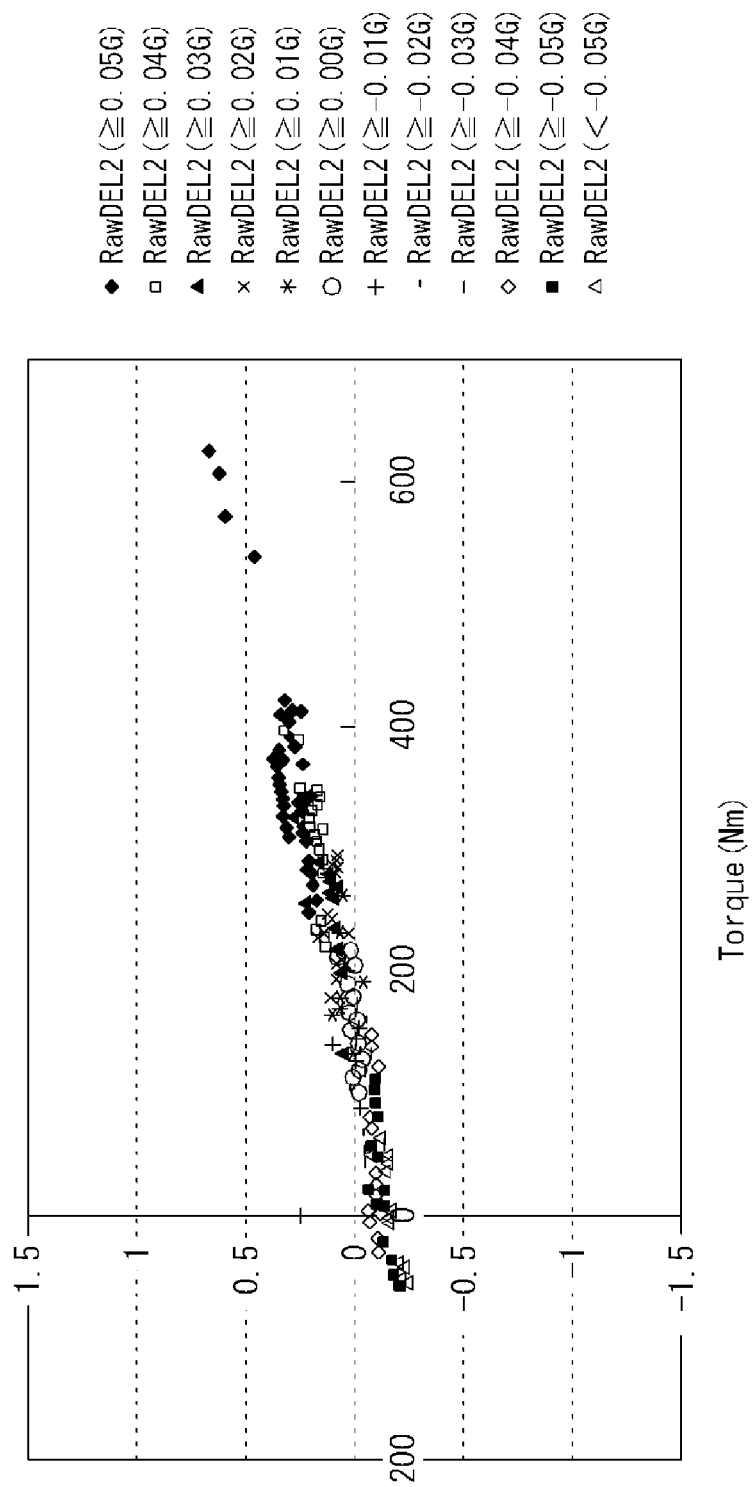
FIG. 10 illustrates the relation between the rotation speed ratio between the front wheels and the rear wheels corrected by the regression line of FIG. 9 and the wheel torque.

FIG. 10 shows the relation between the rotation speed ratio between the front wheels and the rear wheels corrected by the regression line shown in FIG. 9 (the rotation speed ratio between the front wheels and the rear wheels after the correction of the wheel torque) and the wheel torque. Specifically, with regard to a certain wheel torque, a difference or a displacement from the regression line is assumed as a rotation speed ratio between the front wheels and the rear wheels after the correction of the wheel torque, and a relation between the rotation speed ratio and the wheel torque is shown.

Figure 11:
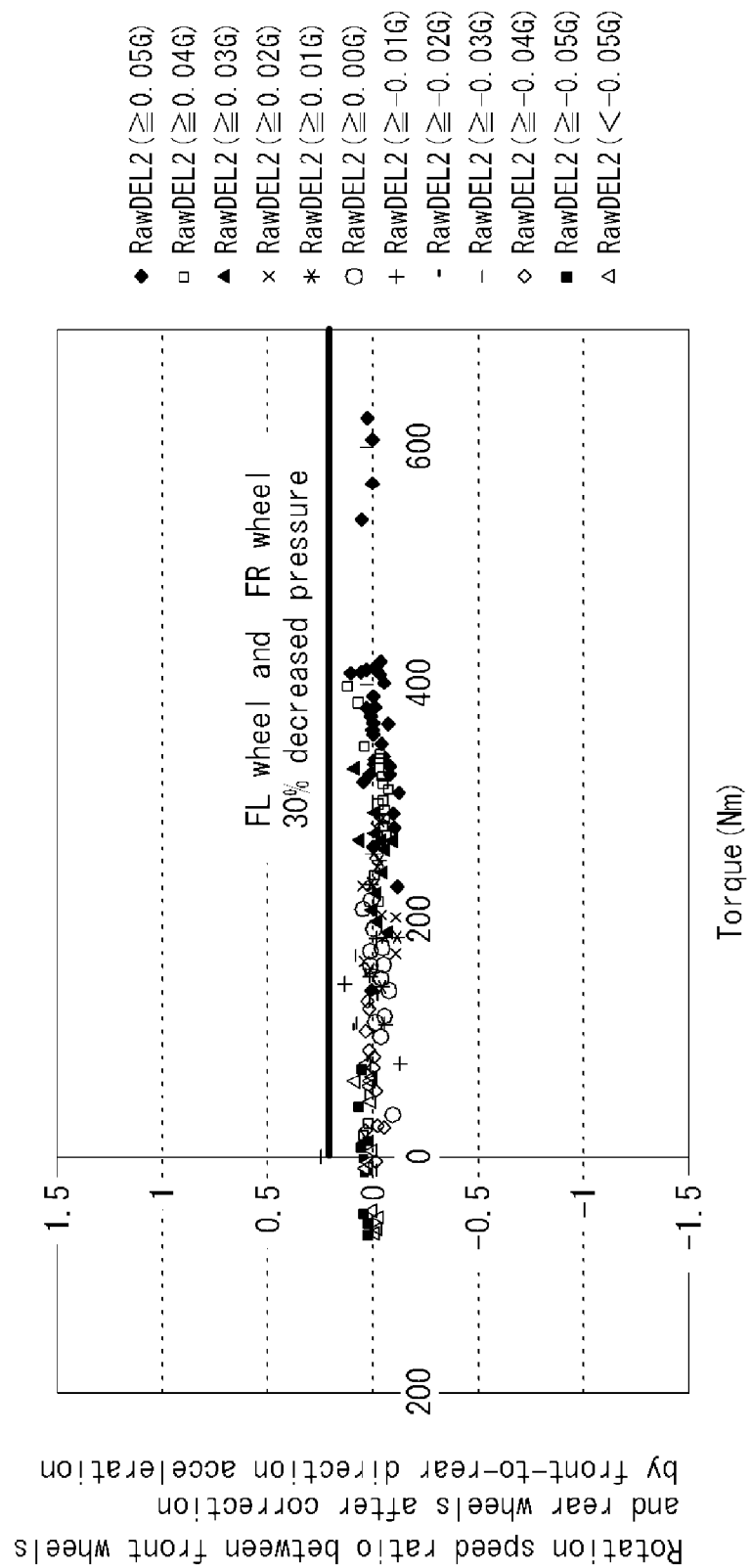
FIG. 11 illustrates the relation between the rotation speed ratio between the front wheels and the rear wheels corrected by the front-to-rear direction acceleration and the wheel torque.

FIG. 11 shows the relation between the rotation speed ratio between the front wheels and the rear wheels after the correction by the front-to-rear direction acceleration (corrected value) and the wheel torque, in which the inclination of the straight line representing the relation between the rotation speed ratio between the front wheels and the rear wheels after the correction of the wheel torque and the wheel torque in FIG. 10 is used as a correction coefficient and the rotation speed ratio is corrected by the front-to-rear direction acceleration based on the formula (4). As can be seen from FIG. 11, in all torque regions, the rotation speed ratio between the front wheels and the rear wheels has a value close to 0. Thus, by using this value as a reference value and by using the degree of the dislocation from this reference value as a judgment criterion, a tire having a decreased pressure can be accurately determined without being influenced by the torque and the front-to-rear direction acceleration. For example, the rotation speed ratio between the front wheels and the rear wheels when a FL wheel and a FR wheel have a 30%-decreased pressure is as shown by the straight line of FIG. 11 (*which* can be calculated by an experiment running). Thus, if a threshold value is set to 0.25, it can be determined that two coaxial front wheels have a decreased pressure.

What is claimed is:

1. An apparatus for detecting a decrease in air pressure of a tire attached to a vehicle, comprising:
    a rotation speed detection means for periodically detecting rotation speeds of tires of respective wheels of the vehicle;
    a rotation wheel speed ratio calculation means for calculating, based on rotation speed information obtained by the rotation speed detection means, a rotation wheel speed ratio between front wheels and rear wheels of the vehicle with regard to a plurality of predetermined speed regions;
    a wheel torque calculation means for calculating a wheel torque of the vehicle;
    an initialization means for obtaining, with regard to the respective speed regions, a relation at a normal internal pressure between the wheel torque and the rotation wheel speed ratio between the front wheels and the rear wheels;
    a storage means for storing the relation obtained by the initialization means;
    a comparison means for comparing, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the relation stored by the storage means; and
    a determination means for correcting the comparison result by the comparison means by a front-to-rear direction acceleration and for determining, based on the resultant corrected value, whether there is a tire having a decreased air pressure or not.

2. The apparatus for detecting a decrease in air pressure of a tire according to claim 1,
    wherein the initialization means includes a means for obtaining, with regard to the respective speed regions, a relation at a normal internal pressure between the wheel torque and the rotation wheel speed ratio between the front wheels and the rear wheels based on a regression line, and wherein the comparison means is so configured as to compare, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the regression line.

3. The apparatus for detecting a decrease in air pressure of a tire according to claim 1,
wherein the initialization means includes a means for setting a plurality of wheel torque regions with regard to the respective speed regions, and for calculating, at a normal internal pressure, an average value, for the respective wheel torque regions, of the rotation wheel speed ratios between the front wheels and the rear wheels, and
wherein the comparison means is so configured as to compare, with regard to the respective speed regions, the rotation wheel speed ratio obtained by the rotation wheel speed ratio calculation means with an average value of the rotation wheel speed ratio in a wheel torque region including the wheel torque obtained by the wheel torque calculation means.

4. The apparatus for detecting a decrease in air pressure of a tire according to claim 1,
wherein the initialization means includes a means for setting a plurality of wheel torque regions with regard to the respective speed regions and for calculating, at a normal internal pressure, an average wheel torque value of the respective wheel torque regions and an average value of the rotation wheel speed ratios between the front wheels and the rear wheels and, a means for obtaining a reference straight line connecting the average values of the respective regions, and
wherein the comparison means is so configured as to compare, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the reference straight line.

5. The apparatus for detecting a decrease in air pressure of a tire according to claim 1, wherein the initialization means includes a means for obtaining by a regression line, with regard to the respective speed regions, a relation at a normal internal pressure between a wheel torque and the rotation wheel speed ratio between the front wheels and the rear wheels to calculate, after the regression line is derived, a correction amount by the front-to-rear direction acceleration based on the front-to-rear direction acceleration and the displacement from the regression line.

6. The apparatus for detecting a decrease in air pressure of a tire according to claim 1, wherein the initialization means includes a means for setting a plurality of wheel torque regions for the respective speed regions to calculate, at a normal internal pressure, an average value of rotation wheel speed ratios between the front wheels and the rear wheels with regard to the respective wheel torque regions to calculate, after the average value is derived, a correction amount by the front-to-rear direction acceleration based on the front-to-rear direction acceleration and the displacement from the average value.

7. The apparatus for detecting a decrease in air pressure of a tire according to claim 1, wherein the initialization means includes a means for setting a plurality of wheel torque regions for the respective speed regions to calculate, at a normal internal pressure and with regard to the respective wheel torque regions, an average wheel torque value and an average rotation wheel speed ratio between the front wheels and the rear wheels and a means for calculating a reference line connecting the average values of the respective regions to calculate, after the reference line is derived, based on the front-to-rear direction acceleration and the displacement from the reference line, a correction amount by the front-to-rear direction acceleration.

8. A method for detecting a decrease in air pressure of a tire attached to a vehicle, comprising:
a processor configured to perform the following steps:
a rotation speed detection step of periodically detecting rotation speeds of tires of respective wheels of the vehicle;
a rotation wheel speed ratio calculation step of calculating, based on rotation speed information obtained in the rotation speed detection step, a rotation wheel speed ratio between front wheels and rear wheels of the vehicle with regard to a plurality of predetermined speed regions;
a wheel torque calculation step of calculating a wheel torque of the vehicle;
an initialization step of obtaining, with regard to the respective speed regions, a relation at a normal internal pressure between the wheel torque and the rotation wheel speed ratio between the front wheels and the rear wheels;
a storage step of storing the relation obtained in the initialization step;
a comparison step of comparing, with regard to the respective speed regions, the rotation wheel speed ratio with the rotation wheel speed ratio at a normal internal pressure obtained from the wheel torque and the stored relation; and
a determination step for correcting the comparison result in the comparison step by a front-to-rear direction acceleration and for determining, based on the resultant corrected value, whether there is a tire having a decreased air pressure or not.

9. The method for detecting a decrease in air pressure of a tire according to claim 8,
wherein the initialization step includes a step of obtaining, with regard to the respective speed regions, a relation at a normal internal pressure between the wheel torque and the rotation wheel speed ratio between the front wheels and the rear wheels based on a regression line, and
wherein the comparison step is so configured as to compare, with regard to the respective speed regions, the rotation wheel speed ratio obtained in the rotation wheel speed ratio calculation step with the rotation wheel speed ratio at a normal internal pressure obtained from the wheel torque obtained in the wheel torque calculation step and the regression line.

10. The method for detecting a decrease in air pressure of a tire according to claim 8,
wherein the initialization step includes an average value calculation step of setting a plurality of wheel torque regions with regard to the respective speed regions and of calculating, at a normal internal pressure, an average value, for the respective wheel torque regions, of the rotation wheel speed ratios between the front wheels and the rear wheels, and
wherein the comparison step is so configured as to compare, with regard to the respective speed regions, the rotation wheel speed ratio obtained in the rotation wheel speed ratio calculation step with an average value of the rotation wheel speed ratio in a wheel torque region including the wheel torque obtained in the wheel torque calculation step.

11. The method for detecting a decrease in air pressure of a tire according to claim 8,
wherein the initialization step includes an average value calculation step of setting a plurality of wheel torque regions with regard to the respective speed regions and of calculating, at a normal internal pressure, an average wheel torque value of the respective wheel torque regions and an average value of the rotation wheel speed ratios between the front wheels and the rear wheels and, a step of obtaining a reference straight line connecting the average values of the respective regions, and
wherein the comparison step is so configured as to compare, with regard to the respective speed regions, the rotation wheel speed ratio obtained in the rotation wheel speed ratio calculation step with the rotation wheel speed ratio at a normal internal pressure obtained from the wheel torque obtained in the wheel torque calculation step and the reference straight line.

12. The method for detecting a decrease in air pressure of a tire according to claim 8, wherein the initialization step includes a step for obtaining by a regression line, with regard to the respective speed regions, a relation at a normal internal pressure between a wheel torque and the rotation wheel speed ratio between the front wheels and the rear wheels to calculate, after the regression line is derived, a correction amount by the front-to-rear direction acceleration based on the front-to-rear direction acceleration and the displacement from the regression line.

13. The method for detecting a decrease in air pressure of a tire according to claim 8, wherein the initialization step includes a step for setting a plurality of wheel torque regions for the respective speed regions to calculate, at a normal internal pressure, an average value of rotation wheel speed ratios between the front wheels and the rear wheels with regard to the respective wheel torque regions to calculate, after the average value is derived, a correction amount by the front-to-rear direction acceleration based on the front-to-rear direction acceleration and the displacement from the average value.

14. The method for detecting a decrease in air pressure of a tire according to claim 8, wherein the initialization step includes a step for setting a plurality of wheel torque regions for the respective speed regions to calculate, at a normal internal pressure and with regard to the respective wheel torque regions, an average wheel torque value and an average rotation wheel speed ratio between the front wheels and the rear wheels and a step for obtaining a reference line connecting the average values of the respective regions to calculate, after the reference line is derived, based on the front-to-rear direction acceleration and the displacement from the reference line, a correction amount by the front-to-rear direction acceleration.

15. A computer program product for detecting a decrease in air pressure of a tire, the computer program product comprising a non-transitory computer-readable storage medium having computer-executable program code stored therein, the computer-executable program code causing, in order to detect a decrease in an air pressure of a tire attached to a vehicle, a computer to function as:
a rotation wheel speed ratio calculation means for calculating, based on rotation speed information obtained by a rotation speed detection means for periodically detecting rotation speeds of tires of respective wheels of the vehicle, a rotation wheel speed ratio between front wheels and rear wheels of the vehicle with regard to a plurality of predetermined speed regions; a wheel torque calculation means for calculating a wheel torque of the vehicle; an initialization means for obtaining a relation at a normal internal pressure between the wheel torque and the rotation wheel speed ratio between the front wheels and the rear wheels with regard to the respective speed regions; a comparison means for comparing, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the relation obtained by the initialization means; and a determination means for correcting the comparison result by the comparison means by a front-to-rear direction acceleration and for determining, based on the resultant corrected value, whether there is a tire having a decreased air pressure or not.

16. The program for detecting a decrease in air pressure of a tire according to claim 15,
wherein the initialization means includes a means for obtaining, with regard to the respective speed regions, a relation at a normal internal pressure between the wheel torque and the rotation wheel speed ratio between the front wheels and the rear wheels based on a regression line, and
wherein the comparison means is so configured as to compare, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the regression line.

17. The program for detecting a decrease in air pressure of a tire according to claim 15,
wherein the initialization means includes a means for setting a plurality of wheel torque regions with regard to the respective speed regions and for calculating, at a normal internal pressure, an average value, for the respective wheel torque regions, of the rotation wheel speed ratios between the front wheels and the rear wheels, and
wherein the comparison means is so configured as to compare, with regard to the respective speed regions, the rotation wheel speed ratio obtained by the rotation wheel speed ratio calculation means with an average value of the rotation wheel speed ratio in a wheel torque region including the wheel torque obtained by the wheel torque calculation means.

18. The program for detecting a decrease in air pressure of a tire according to claim 15,
wherein the initialization means includes a means for setting a plurality of wheel torque regions with regard to the respective speed regions and for calculating, at a normal internal pressure, an average wheel torque value of the respective wheel torque regions and an average value of the rotation wheel speed ratios between the front wheels and the rear wheels and, a means for obtaining a reference straight line connecting the average values of the respective regions, and
wherein the comparison means is so configured as to compare, with regard to the respective speed regions, the rotation wheel speed ratio obtained by the rotation wheel speed ratio calculation means with the rotation wheel speed ratio at a normal internal pressure obtained from the wheel torque obtained by the wheel torque calculation means and the reference straight line.

19. The program for detecting a decrease in air pressure of a tire according to claim 15, wherein the initialization means includes a means for calculating by a regression line, with regard to the respective speed regions, a relation at a normal internal pressure between a wheel torque and the rotation wheel speed ratio between the front wheels and the rear wheels to calculate, after the regression line is derived, a correction amount by the front-to-rear direction acceleration based on the front-to-rear direction acceleration and the displacement from the regression line.

20. The program for detecting a decrease in air pressure of a tire according to claim 15, wherein the initialization means includes a means for setting a plurality of wheel torque regions for the respective speed regions to calculate, at a normal internal pressure, an average value of rotation wheel speed ratios between the front wheels and the rear wheels with regard to the respective wheel torque regions to calculate, after the average value is derived, a correction amount by the front-to-rear direction acceleration based on the front-to-rear direction acceleration and the displacement from the average value.

21. The program for detecting a decrease in air pressure of a tire according to claim 15, wherein the initialization means includes a means for setting a plurality of wheel torque regions for the respective speed regions to calculate, at a normal internal pressure and with regard to the respective wheel torque regions, an average wheel torque value and an average rotation wheel speed ratio between the front wheels and the rear wheels and a means for obtaining a reference line connecting the average values of the respective regions to calculate, after the reference line is derived, based on the front-to-rear direction acceleration and the displacement from the reference line, a correction amount by the front-to-rear direction acceleration.

* * * * *